United States Patent
Kojima et al.

(10) Patent No.: US 7,907,201 B2
(45) Date of Patent: Mar. 15, 2011

(54) IMAGE PICKUP APPARATUS INCLUDING AN OPTICAL FINDER AND AN ELECTRONIC FINDER

(75) Inventors: Kazuhiko Kojima, Osaka (JP); Takahiro Kawaguchi, Osaka (JP)

(73) Assignee: Sony Corporation, Tokyo (JP)

( * ) Notice: Subject to any disclaimer, the term of this patent is extended or adjusted under 35 U.S.C. 154(b) by 563 days.

(21) Appl. No.: 11/967,571

(22) Filed: Dec. 31, 2007

(65) Prior Publication Data

US 2008/0170150 A1 Jul. 17, 2008

(30) Foreign Application Priority Data

Jan. 15, 2007 (JP) ................ P2007-005958

(51) Int. Cl.
*H04N 5/222* (2006.01)
(52) U.S. Cl. ............... 348/333.01; 348/341; 348/344
(58) Field of Classification Search .......... 348/333.01, 348/333.03, 333.08, 333.09, 341, 344
See application file for complete search history.

(56) References Cited

U.S. PATENT DOCUMENTS

| | | | | |
|---|---|---|---|---|
| 4,626,918 A | * | 12/1986 | Morisawa | 348/341 |
| 5,860,034 A | * | 1/1999 | Hori et al. | 396/373 |
| 6,091,450 A | * | 7/2000 | Hirasawa | 348/333.01 |
| 6,374,054 B1 | * | 4/2002 | Schinner | 396/282 |
| 6,630,959 B1 | * | 10/2003 | Shono | 348/344 |
| 7,414,664 B2 | * | 8/2008 | Suda | 348/341 |
| 2003/0044174 A1 | * | 3/2003 | Endo | 396/55 |

FOREIGN PATENT DOCUMENTS

| | | |
|---|---|---|
| JP | 2000-147602 | 5/2000 |
| JP | 2001-16485 | 1/2001 |

* cited by examiner

*Primary Examiner* — John M Villecco
*Assistant Examiner* — Kent Wang
(74) *Attorney, Agent, or Firm* — Oblon, Spivak, Maier & Neustadt, L.L.P.

(57) ABSTRACT

An image pickup apparatus includes an image pickup unit for generating an image signal from an optical subject image, a display having a display mode and a non-display mode, an electronic finder for displaying a preview image on the display, an optical finder for leading the subject image to a finder window, an eye proximity detecting unit for detecting proximity of the eye to the finder window, a shutter having a light-blocking mode and a non-light-blocking mode, a first control unit for switching the display to the non-display mode and switching the shutter to the non-light-blocking mode to lead the subject image to the finder window when the eye proximity detecting unit detects proximity of the eye, and a second control unit for switching the shutter to the light-blocking mode and the display to the display mode to display the preview image when proximity of the eye is not detected.

5 Claims, 8 Drawing Sheets

IMAGE PICKUP APPARATUS INCLUDING AN OPTICAL FINDER AND AN ELECTRONIC FINDER

CROSS REFERENCES TO RELATED APPLICATIONS

The present invention contains subject matter related to Japanese Patent Application JP 2007-005958 filed in the Japanese Patent Office on Jan. 15, 2007, the entire contents of which are incorporated herein by reference.

BACKGROUND OF THE INVENTION

1. Field of the Invention

The present invention relates to an image pickup apparatus including an optical finder function and an electronic finder function.

2. Description of the Related Art

In general, when using digital single-lens reflex cameras, users view a subject through an optical finder. However, some digital single-lens reflex cameras provide an electronic finder function by means of which a moving subject is displayed on a monitor before an image of the subject is actually recorded.

When using such an electronic finder, the photographer's eye is positioned away from a finder window of the optical finder. Accordingly, under a strong light source, such as the sun, an amount of light entering the finder window significantly increases. Thus, a photo-taking optical system is affected by light entering the finder window, and therefore, the quality of a captured image disadvantageously deteriorates. To solve this problem, an eyepiece shutter that can block ambient light from entering the finder window may be disposed in the vicinity of the finder window.

For example, a single-lens reflex camera described in Japanese Unexamined Patent Application Publication No. 2001-16485 blocks entrance of ambient light by closing the eyepiece shutter simultaneously when a user manually switches to using an electronic finder.

In addition, a single-lens reflex camera described in Japanese Unexamined Patent Application Publication No. 2000-147602 includes an eye proximity detecting unit for detecting proximity of the eye of a photographer to the finder window. When the eye proximity detecting unit detects that the eye is not in proximity to the finder window due to remote-control photography or self-timer shooting, the eyepiece shutter is automatically closed so as to block external light from entering the camera.

SUMMARY OF THE INVENTION

However, in the camera described in Japanese Unexamined Patent Application Publication No. 2001-16485, since the eyepiece shutter is closed in synchronization with a manual switch operation performed to switch to the electronic finder, a photographer needs to perform the manual switch operation.

In contrast, in the camera described in Japanese Unexamined Patent Application Publication No. 2000-147602, the eyepiece shutter is automatically closed during remote photography or self-timer photography in which the eye proximity detecting unit detects that the eye is not in proximity to the finder window. However, the camera is configured to be a film camera and does not have an electronic finder function. Accordingly, the camera cannot close the eyepiece shutter to block external light from entering through the finder window when an electronic finder is used and when the eye is detected to be not in proximity to the finder window. In addition, when the optical finder is used and the eye is detected to be in proximity to the finder window, the camera cannot turn off the monitor so as to appropriately save power.

Accordingly, the present invention provides an image pickup apparatus that reduces user effort in switching between an optical finder and an electronic finder, that appropriately reduces power consumption, and that reliably blocks external light from entering through a finder window.

According to an embodiment of the present invention, an image pickup apparatus includes (a) image pickup means for generating an image signal associated with a subject optical image that has passed through a predetermined photo-taking optical system, (b) display means capable of being switched between a display mode and a non-display mode, (c) electronic finder means for causing the display means to display a preview image on the basis of image signals sequentially generated by the image pickup means before the image is actually recorded, (d) optical finder means for leading the subject optical image that has passed through the predetermined photo-taking optical system to a finder window, (e) eye proximity detecting means for detecting proximity of the eye to the finder window, (f) shutter means capable of being switched between a light-blocking mode and a non-light-blocking mode, where the shutter means blocks an external light ray from entering the image pickup apparatus through the finder window when in the light-blocking mode and allows an external light ray to enter the image pickup apparatus through the finder window when in the non-light-blocking mode, (g) first control means for switching the display means to the non-display mode and switching the shutter means to the non-light-blocking mode so as to lead the subject optical image to the finder window when the eye proximity detecting means detects proximity of the eye to the finder window, and (h) second control means for switching the shutter means to the light-blocking mode and switching the display means to the display mode so as to display the preview image when the eye proximity detecting means does not detect proximity of the eye to the finder window.

According to the embodiment of the present invention, when the eye proximity detecting means detects proximity of the eye to the finder window, the image pickup apparatus causes the display means to enter a non-display mode. In addition, the image pickup apparatus causes the shutter means that can switch between a light-blocking mode and a non-light-blocking mode to enter the non-light-blocking mode. In the light-blocking mode, external light is blocked from entering the image pickup apparatus through the finder window of the optical finder. While, in the non-light-blocking mode, external light is not blocked. Thus, a subject optical image that has passed through a predetermined photo-taking optical system is led to the finder window. In contrast, when the eye proximity detecting means does not detect proximity of the eye to the finder window, the image pickup apparatus causes the shutter means to enter the light-blocking mode, and causes the display means to enter the display mode. Thus, the display means displays a preview image on the basis of image signals sequentially generated by the image pickup means for receiving the subject optical image that has passed through the predetermined photo-taking optical system before one of the images is actually recorded. As a result, the image pickup apparatus can reduce user effort in switching between the optical finder and the electronic finder, appropriately reduce power consumption, and reliably block external light from entering through the finder window.

DESCRIPTION OF THE PREFERRED EMBODIMENTS

First Exemplary Embodiment

Configuration of Image Pickup Apparatus

Figure 1:
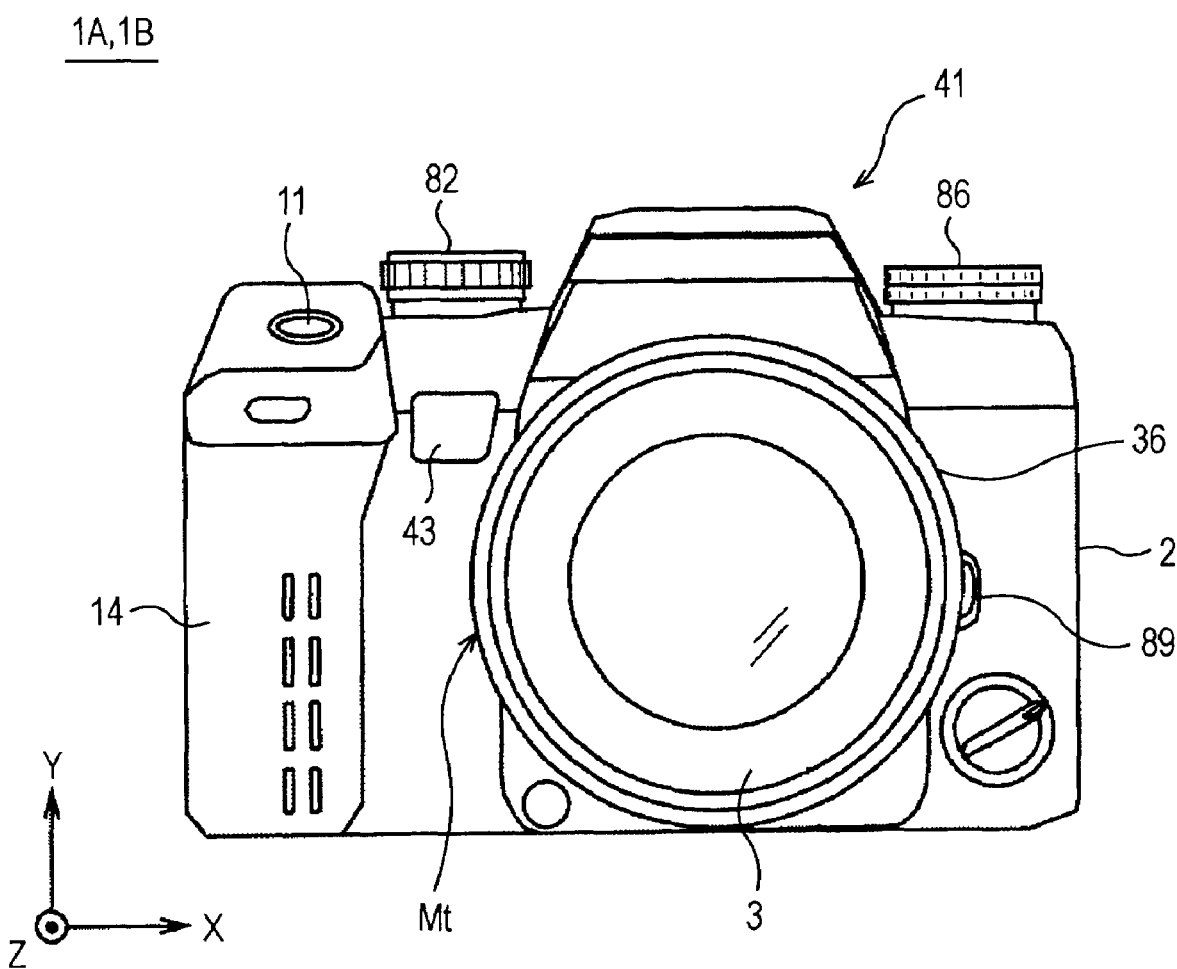
FIG. 1 is a front external view of an image pickup apparatus according to a first exemplary embodiment of the present embodiment.
Figure 2:
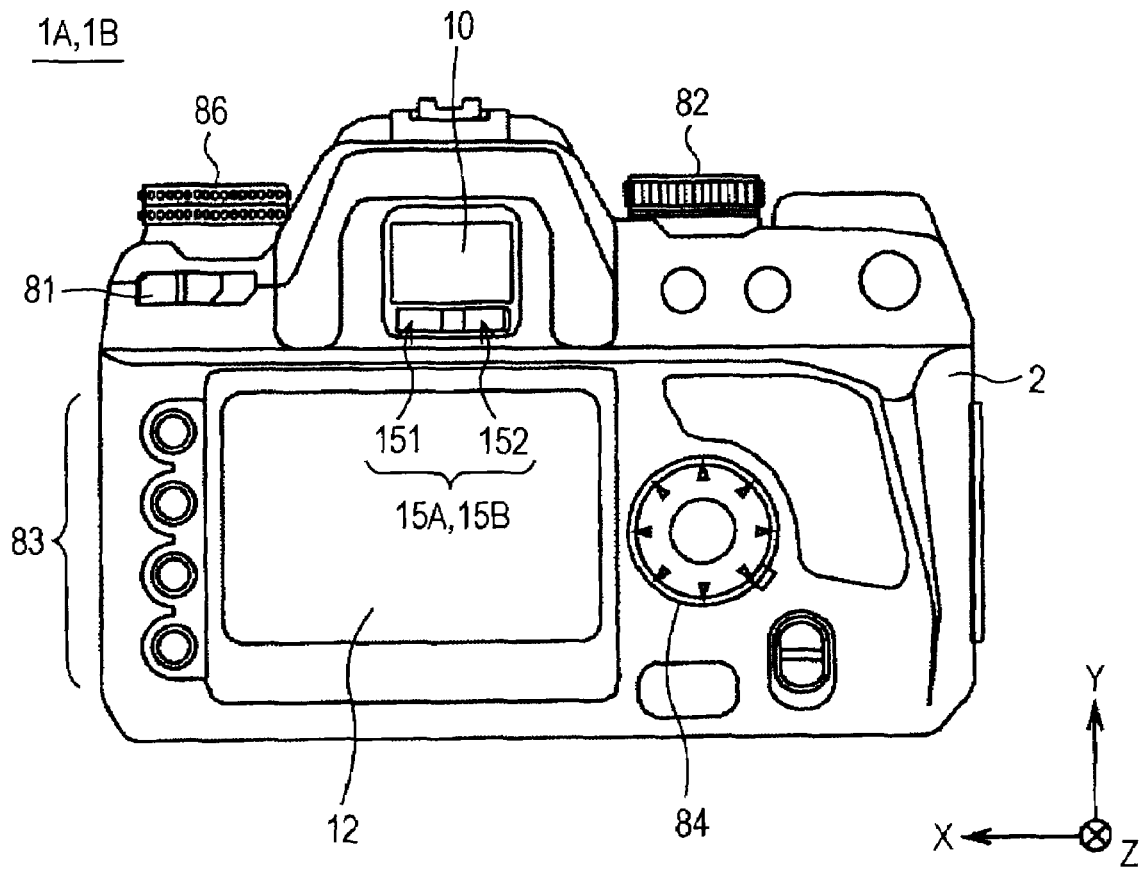
FIG. 2 is a rear external view of the image pickup apparatus shown in FIG. 1.

FIGS. 1 and 2 illustrate an exemplary external structure of an image pickup apparatus 1A according to a first exemplary embodiment. More specifically, FIG. 1 is a front external view of the image pickup apparatus 1A. FIG. 2 is a rear external view of the image pickup apparatus 1A. The image pickup apparatus 1A is configured to be a lens-exchangeable digital single-lens reflex camera.

As shown in FIG. 1, the image pickup apparatus 1A includes a camera body 2. An exchangeable photo-taking lens unit (an interchangeable lens) 3 is removably mounted on the camera body 2.

The photo-taking lens unit 3 includes a lens barrel 36, which includes a lens group 37 (refer to FIGS. 4 and 5) mounted in the lens barrel 36 and an aperture diaphragm. The lens group 37 (a photo-taking optical system) includes a focus lens. The focus position is changed by moving the focus lens along a light axis.

The camera body 2 includes a ring-shaped mount unit Mt at substantially the center portion thereof. The photo-taking lens unit 3 is mounted on the mount unit Mt. The camera body 2 further includes a lens release button 89 in the vicinity of the mount unit Mt. The lens release button 89 is used for dismounting the photo-taking lens unit 3.

In addition, the camera body 2 includes a mode setting dial 82 disposed at the front upper left corner and a control value setting dial 86 disposed at the front upper right corner. By operating the mode setting dial 82, a setting operation (a switching operation) can be performed. Examples of the setting operations include shooting mode setting (e.g., selecting of a portrait mode, a landscape mode, or a full-auto mode), playback mode setting for playing back a captured image, and communication mode setting with an external device. By operating the control value setting dial 86, a control parameter for the shooting mode settings can be set.

Furthermore, the camera body 2 includes a grip 14 at front left end thereof. The grip 14 allows a photographer to firmly hold the image pickup apparatus 1A. The camera body 2 further includes a release button 11 on the upper surface of the grip 14 used for instructing the image pickup apparatus 1A to start exposure. A battery compartment and a card compartment are provided inside the grip 11. The battery compartment can contain a battery (e.g., four AA size batteries) serving as a power supply of the camera. The card compartment can removably hold a memory card 90 (refer to FIG. 4) for recording image data of a captured image.

The release button 11 can detect whether it is pressed halfway down (an S1 state) or fully down (an S2 state). When the release button 11 enters the S1 state in which it is pressed halfway down, the image pickup apparatus 1A prepares for acquiring a recorded still image of a subject (an image to be actually recorded). Examples of the preparation include an autofocus (AF) control operation and an auto exposure (AE) control operation. When the release button 11 is further pressed down and enters the S2 state, the image pickup apparatus 1A performs an image capturing operation of the image to be actually recorded. The image capturing operation is a series of operations including an exposure operation of the subject image (an optical image of the subject) performed using an image sensor 5 (described below) and a predetermined image processing operation on an image signal acquired through the exposure operation.

As shown in FIG. 2, the camera body 2 further includes a finder window (an eyepiece window) 10 at substantially the top center of the rear surface. Through the finder window 10, the photographer can view the optical image of a subject led by the photo-taking lens unit 3 to determine a composition. That is, by using an optical finder for leading a subject image that has passed through the lens group 37 (refer to FIG. 5) to the finder window 10, the photographer can determine a composition. This operation is described in more detail below.

Figure 3:
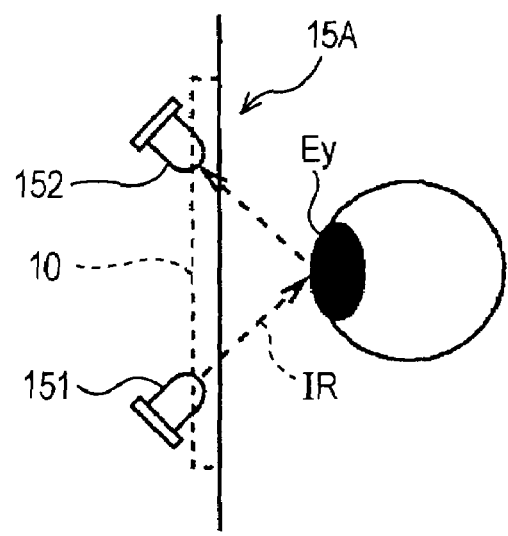
FIG. 3 illustrates a principle of detecting proximity of the eye to a finder window in an eye proximity detecting unit.

An eye proximity detecting unit 15A is provided under the finder window 10. The eye proximity detecting unit 15A includes an infrared light-emitting diode (LED) 151 and a light detecting sensor 152. As shown in FIG. 3, infrared light IR is emitted from the light projection LED 151 and is reflected off an eye Ey of the photographer. By detecting the reflected light using the light detecting sensor 152, whether the eye Ey of the photographer is in proximity to the finder window 10 (eye proximity detection) can be detected.

Alternatively, according to the present exemplary embodiment, the photographer can determine the composition using a live view image (a preview image) displayed on a rear monitor 12 of the image pickup apparatus 1A before actually recording an image. This operation is described in more detail below. A switch between the composition operation using a live view display (an electronic finder) and the composition operation using the optical finder is automatically performed in accordance with whether or not the eye proximity detecting unit 15A detects that a user's eye is in proximity to the finder window 10.

As shown in FIG. 2, the camera body 2 further includes the rear monitor 12 on the rear surface at substantially the center thereof. The rear monitor 12 includes, for example, a color liquid crystal display (LCD). The display of the rear monitor 12 can be turned on (a display mode) and off (a non-display mode). The rear monitor 12 can display a menu screen used for setting, for example, shooting conditions. The rear monitor 12 can further play back and display a captured image recorded in the memory card 90 when the image pickup apparatus 1A is in a playback mode. Furthermore, the rear monitor 12 can display a live view on the basis of a plurality of time-series images (i.e., a moving image) captured by an image sensor 7 (described below).

A main switch 81 is provided at the upper left corner of the rear monitor 12. The main switch 81 is a dual contact slide switch that slides in a horizontal direction. When the main switch 81 is set to an "OFF" position on the left, the image pickup apparatus 1A is powered off. In contrast, when the main switch 81 is set to an "ON" position on the right, the image pickup apparatus 1A is powered on.

A direction selection key 84 is provided on the right of the rear monitor 12. The direction selection key 84 includes a circular operation button. The direction selection key 84 can detect a push operation on each of upper, lower, left, and right portions of the circular operation button. The direction selection key 84 can further detect a push operation on each of upper right, upper left, lower right, and lower left portions of the circular operation button. The direction selection key 84 includes a push button at the center thereof and can detect a push operation on the center push button in addition to the push operations on the above-described eight portions.

A setting button group 83 including a plurality of buttons used for, for example, setting the menu screen and deleting an image is disposed on the left of the rear monitor 12.

Figure 4:
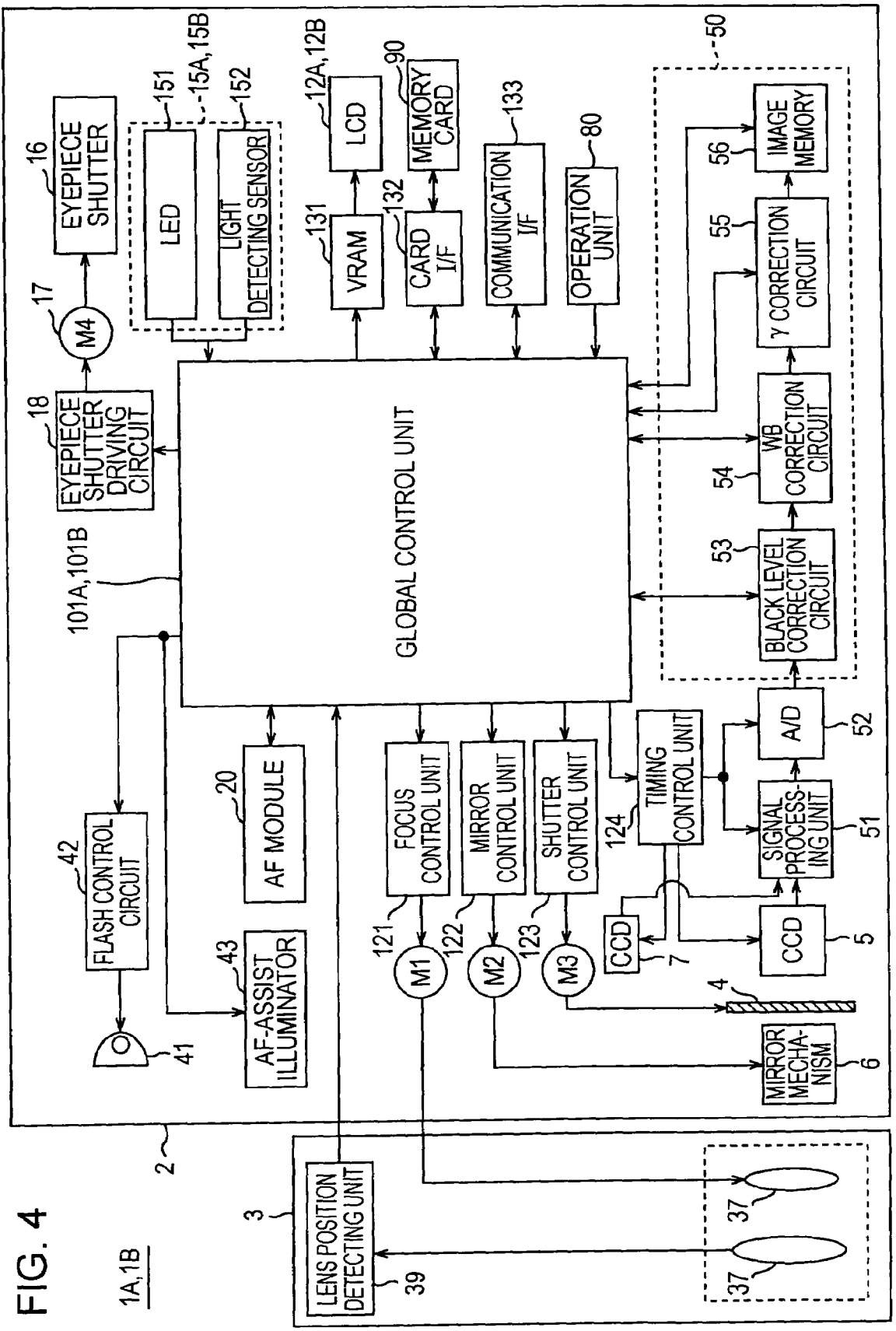
FIG. 4 is a block diagram illustrating a functional structure of the image pickup apparatus.

Exemplary features of the image pickup apparatus 1A are briefly described next with reference to FIG. 4. FIG. 4 is a block diagram illustrating a functional structure of the image pickup apparatus 1A.

As shown in FIG. 4, the image pickup apparatus 1A includes an operation unit 80, a global control unit 101A, a focus control unit 121, a mirror control unit 122, a shutter control unit 123, a timing control unit 124, and a digital signal processing circuit 50.

The operation unit 80 includes a variety of buttons and switches, one of which is the release button 11 (refer to FIG. 1). In response to a user input operation on the operation unit 80, the global control unit 101A performs the corresponding operation.

The global control unit 101A includes a microcomputer, which includes a central processing unit (CPU), a memory, and a read-only memory (ROM). The global control unit 101A achieves a variety of features by reading out a program stored in the ROM and executing the program using the CPU. For example, the global control unit 101A performs a focus control operation for controlling the position of the focus lens in cooperation with an AF module 20 and the focus control unit 121. In addition, the global control unit 101A performs an AF operation using the focus control unit 121 in accordance with a focusing state of a subject detected by the AF module 20. The AF module 20 can detect the focusing state of the subject using the light ray emitted from the subject and led by the mirror mechanism 6 and using a focusing state detection method, such as a phase difference method.

The focus control unit 121 generates a control signal on the basis of a signal input from the global control unit 101A so as to drive a motor M1. In this way, the focus control unit 121 performs control so as to move the focus lens included in the lens group 37 of the photo-taking lens unit 3. The position of the focus lens is detected by a lens position detecting unit 39 of the photo-taking lens unit 3. Data indicating the position of the focus lens is delivered to the global control unit 101A. Thus, the focus control unit 121 and the global control unit 101A control the movement of the focus lens in a light axis direction.

The mirror control unit 122 controls switch between a state (a mirror up state) in which a mirror mechanism 6 is positioned away from a light path and a state (a mirror down state) in which the mirror mechanism 6 blocks the light path. The mirror control unit 122 generates a control signal on the basis of a signal input from the global control unit 101A so as to drive a motor M2. In this way, the mirror control unit 122 switches between the mirror up state and the mirror down state.

The shutter control unit 123 generates a control signal on the basis of a signal input from the global control unit 101A so as to drive a motor M3. In this way, the shutter control unit 123 opens and closes a shutter 4.

The timing control unit 124 controls a variety of timings relating to the image sensor 5.

The image sensor (hereinafter also referred to as a "CCD sensor" or simply a "CCD") 5 photoelectrically converts the optical image of a subject to an electrical signal so as to generate an image signal to be recorded (a recording image signal). That is, the image sensor 5 is an image sensor for acquiring an image signal to be recorded.

In response to drive control signals (an accumulation start signal and an accumulation end signal) input from the timing control unit 124, the image sensor 5 performs an exposure operation (an electrical charge accumulation operation through photoelectrical conversion) of a subject image formed on a light receiving surface so as to generate an image signal associated with the subject image. In addition, in response to a readout control signal input from the timing control unit 124, the image sensor 5 outputs the image signal to a signal processing unit 51. A timing signal (a synchronization signal) output from the timing control unit 124 is input to the signal processing unit 51 and an analog/digital (A/D) conversion circuit 52.

The signal processing unit 51 performs predetermined analog signal processing on the image signal acquired by the image sensor 5. After the image signal is subjected to the predetermined analog signal processing, the image signal is converted to digital image data (image data) by the A/D conversion circuit 52. The image data is input to a digital signal processing circuit 50.

The digital signal processing circuit 50 performs digital signal processing on the image data input from the A/D conversion circuit 52 so as to generate image data associated with the captured image. The digital signal processing circuit 50 includes a black level correction circuit 53, a white balance (WB) correction circuit 54, a γ correction circuit 55, and an image memory 56.

The black level correction circuit 53 corrects the black level of each of the pixel data items of the image data output from the A/D conversion circuit 52 to a reference black level. The WB correction circuit 54 controls the white balance of the image. The γ correction circuit 55 controls the gradation characteristic of the captured image. The image memory 56 is a high-speed image memory that temporarily stores the generated image data. The image memory 56 has a memory capacity so as to store image data for a plurality of frames.

When an image is recorded, the image data temporarily stored in the image memory 56 is appropriately subjected to image processing (e.g., a compression process) by the global control unit 101A. Thereafter, the image data is stored in the memory card 90 via a card interface (I/F) 132.

In addition, the image data temporarily stored in the image memory 56 is transferred to a VRAM 131 by the global control unit 101A as needed. Thus, an image is displayed on the rear monitor 12 on the basis of the image data. In this way, a display function for a user to check the captured image can be achieved (after-view), and a display function for playing back a recorded image can be achieved.

The image pickup apparatus 1A further includes an image sensor 7 (refer to FIG. 4) in addition to the image sensor 5. The image sensor 7 serves as an image sensor for capturing a live view image for the electronic finder. That is, the image sensor 7 generates an image signal relating to a subject optical image that passed through the lens group (the photo-taking optical system) 37 and reflected off a main mirror 61. Thus, the image sensor 7 causes a rear monitor 12A to display a live view on the basis of the image signal of the subject sequentially generated by the image sensor 7. In this way, the electronic finder function of the image pickup apparatus 1A can be achieved.

The image sensor 7 has a configuration similar to that of the image sensor 5. However, the image sensor 7 only needs the resolution sufficient for generating an image signal (a moving image) for a live view. Therefore, in general, the number of pixels of the image sensor 7 is lower than that of the image sensor 5.

Image processing similar to that applied to the image signal acquired by the image sensor 5 is performed on the image signal acquired by the image sensor 7. That is, the image signal acquired by the image sensor 7 is subjected to predetermined signal processing by the signal processing unit 51. Thereafter, the image signal is converted to a digital signal by the A/D conversion circuit 52 and is subjected to predetermined image processing by the digital signal processing circuit 50. The image signal is then stored in the image memory 56.

In addition, the time-series image data items acquired by the image sensor 7 and stored in the image memory 56 are sequentially sent to the VRAM 131 by the global control unit 101A. Thus, an image is displayed on the rear monitor 12 on the basis of the time-series image data items. In this way, a moving image display (a live view display) used for determining the composition can be achieved.

The image pickup apparatus 1A further includes a communication I/F 133 so as to communicate data with an apparatus (e.g., a personal computer) that is connected to the communication I/F 133.

The image pickup apparatus 1A further includes a flash 41, a flash control circuit 42, and an AF-assist illuminator 43. The flash 41 is a light source used when a subject is not sufficiently luminated. The use of the flash 41 and the period of time of flash lighting are controlled by the flash control circuit 42 and the global control unit 101A. The AF-assist illuminator 43 is an auxiliary light source used for the AF operation. The use of the AF-assist illuminator 43 and the period of time of AF-assist lighting are controlled by the global control unit 101A.

The image pickup apparatus 1A further includes an eyepiece shutter 16, a motor 17, and an eyepiece shutter driving circuit 18. The eyepiece shutter 16 can block the light path of a finder optical system disposed inside the camera body 2 from the finder window 10. The eyepiece shutter 16 is described in more detail below. The motor 17 provides a driving force for opening and closing the eyepiece shutter 16. The eyepiece shutter driving circuit 18 supplies a driving electrical power to the motor 17 so as to control the motor 17.

Operation of Determining Composition (Framing Operation) Performed by Image Pickup Apparatus 1A An exemplary operation of determining a composition (a framing operation) performed by the image pickup apparatus 1A is described next. As noted above, in the image pickup apparatus 1A, a photographer can determine a composition by using the optical finder (also referred to as an "optical viewfinder (OVF)") including the finder optical system or using a live view image displayed on the rear monitor 12 (a composition using an electronic finder).

Depending on proximity of the eye detected by the eye proximity detecting unit 15A, one of a composition determination using the optical finder and a composition determination using the electronic finder is automatically selected. Thus, the workload of the photographer can be reduced when the photographer selects one of the optical finder and the electronic finder.

Figure 5:
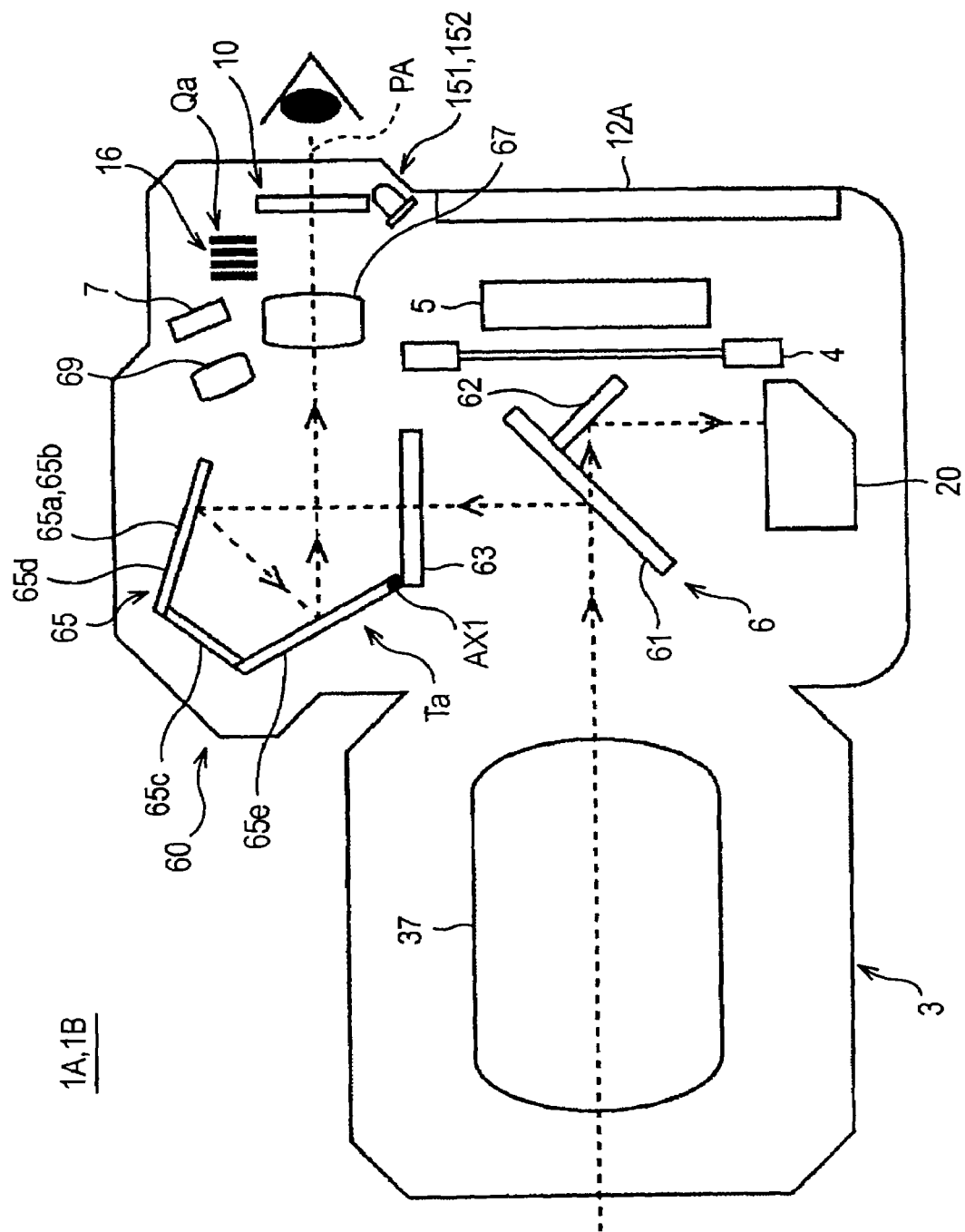
FIG. 5 illustrates an operation of determining a composition using an optical finder.
Figure 6:
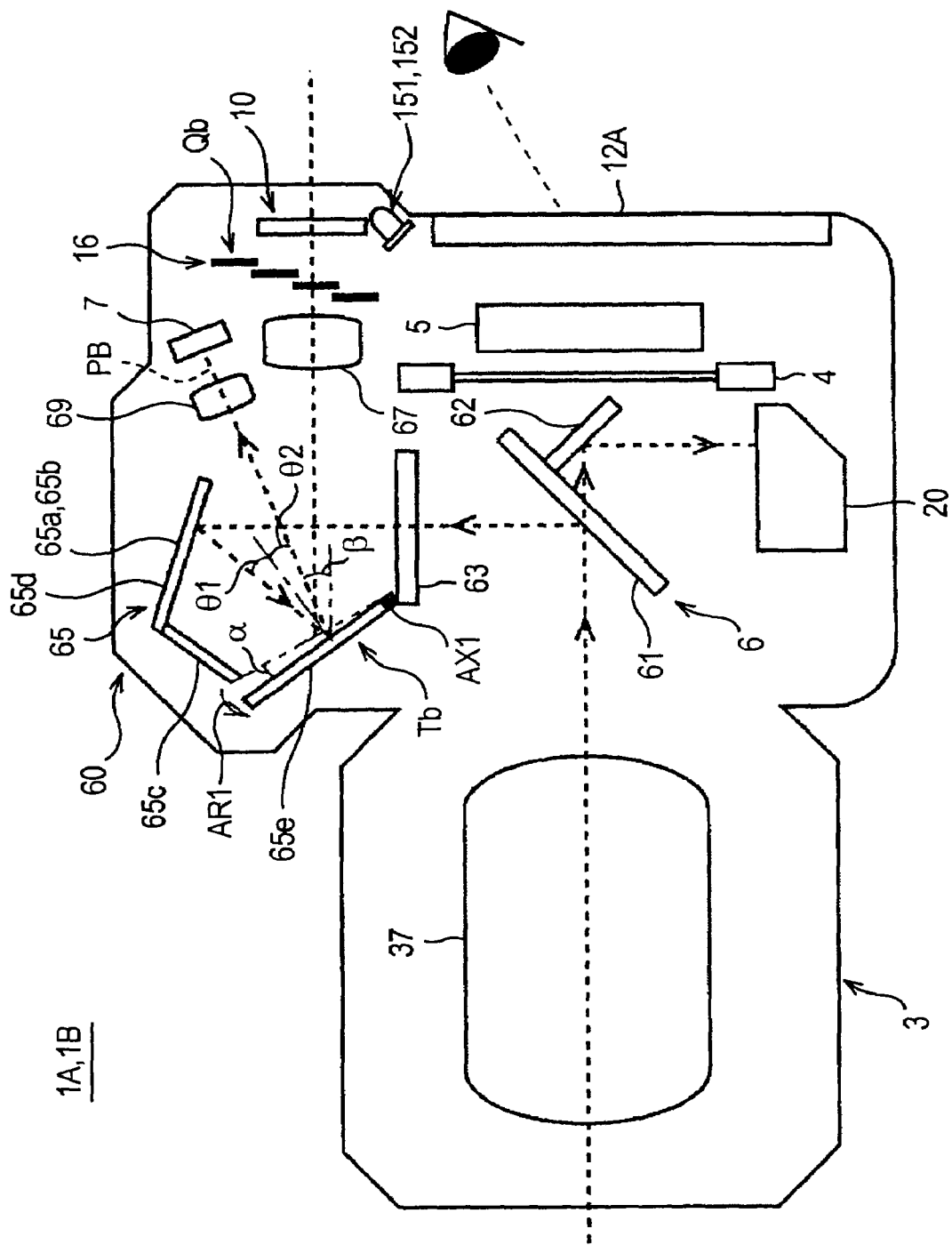
FIG. 6 illustrates an operation of determining a composition using an electronic finder.

FIGS. 5 and 6 are cross-sectional views of the image pickup apparatus 1A. More specifically, FIG. 5 illustrates an operation of determining a composition using the optical finder. FIG. 6 illustrates an operation of determining a composition using the electronic finder.

As shown in FIG. 5, the mirror mechanism 6 is located in an optical path (photo-taking optical path) extending from the photo-taking lens unit 3 to the image sensor 5. The mirror mechanism 6 includes the main mirror 61 (a primary reflecting surface) that reflects light traveling from the photo-taking optical system upwards. For example, part or the entirety of the main mirror 61 is a half-mirror. Thus, the main mirror 61 allows part of the light traveling from the photo-taking optical system to pass therethrough. In addition, the mirror mechanism 6 includes a sub-mirror 62 (a secondary reflecting surface) for reflecting light that has passed through the main mirror 61 downwards. The light reflected off the sub-mirror 62 downwards is led towards the AF module 20 and is made incident on the AF module 20. Thus, the light is used for an AF operation using a phase difference method.

In a shooting mode, the mirror mechanism 6 is disposed so that the mirror mechanism 6 is in a mirror down state until the release button 11 enters the S2 state in which the release button 11 is pressed fully down, that is, while a composition is decided upon (refer to FIGS. 5 and 6). At that time, a subject image traveling from the photo-taking lens unit 3 is reflected off the main mirror 61 upwards and is made incident on a pentamirror 65 as an observation light ray. The pentamirror 65 includes a plurality of mirrors (reflecting surfaces) so as to control the orientation of the subject image. After the observation light ray is made incident on the pentamirror 65, the direction of the observation light ray is determined depending on which one of the above-described two methods (i.e., an optical finder method and an electronic finder method) is selected for determining a composition. This is described in more detail below.

In contrast, when the release button 11 enters the S2 state in which the release button 11 is pressed fully down, the mirror mechanism 6 is driven so as to enter a mirror up state. Thus, an exposure operation is started. The operation (i.e., the exposure operation) performed when a still image for recording (also referred to as an "image to be actually captured") relating to the subject is captured is the same for the above-described two methods (i.e., an optical finder method and an electronic finder method).

Operations of determining a composition using the optical finder and the electronic finder are described next.

Operation of Determining Composition Using Optical Finder

The operation of determining a composition using the optical finder is described first.

As shown in FIG. 5, when the main mirror 61 and the sub-mirror 62 of the mirror mechanism 6 are disposed in the light path of a subject image traveling from the photo-taking lens unit 3, the subject image is led to the finder window 10 via the main mirror 61, the pentamirror 65, and an eyepiece lens 67. In such an optical finder, the observation light ray, which is a light ray traveling from the lens group (the photo-taking optical system) 37 and is reflected off the main mirror (the main reflecting surface) 61, can be led to the finder window 10 using a finder optical system 60. The finder optical system 60 includes the main mirror 61, the pentamirror 65, and the eyepiece lens 67.

More specifically, the light traveling from the photo-taking lens unit 3 is reflected off the main mirror 61 upwards. Thereafter, the light is focused on a focusing glass 63 and passes through the focusing glass 63. Subsequently, the direction of the light that has passed through the focusing glass 63 is further changed by the pentamirror 65 and passes through the eyepiece lens 67. The light then travels toward the finder window 10 (refer to a light path PA shown in FIG. 5). In this way, the subject image passes through the finder window 10 and reaches the eye of the photographer (an observer). Thus, the photographer views the object image. That is, by viewing through the finder window 10, the photographer can recognize the object image.

The pentamirror 65 includes two mirrors (dach mirrors) 65a and 65b that form a delta shape, a surface 65c fixed to the dach mirrors (dach surface) 65a and 65b, and a mirror (a reflecting surface) 65e. The dach mirrors 65a and 65b are formed using plastic molding as an integrated part 65d having a delta shape. The light ray that is reflected off the main mirror 61 upward is reflected by the dach mirrors 65a and 65b. Thus, the light ray is horizontally reversed. Thereafter, the light ray is reflected off the mirror 65e so as to be vertically reversed. Finally, the light ray reaches the eye of the photographer. In this way, the optical image that is horizontally and vertically reversed in the photo-taking lens unit 3 is further horizontally and vertically reversed by the pentamirror 65. As a result, the photographer can view the subject image having the horizontal and vertical orientations the same as those of the original subject.

The light ray that passed through the main mirror 61 is reflected off the sub-mirror 62 downwards and enters the AF module 20. The AF module 20 and the focus control unit 121 perform an AF operation using the light ray traveling via the main mirror 61 and the sub-mirror 62.

Operation of Determining Composition Using Electronic Finder

Operations of determining a composition using the electronic finder is described next.

Like the above-described case, as shown in FIG. 6, the main mirror 61 and the sub-mirror 62 of the mirror mechanism 6 are disposed in the light path of a subject image traveling from the photo-taking lens unit 3. The light traveling from the photo-taking lens unit 3 is reflected off the main mirror 61 upwards, and is focused on the focusing glass 63, and then passes through the focusing glass 63.

However, in the operation of determining a composition using the electronic finder, the direction of the light ray that has passed through the focusing glass 63 is further changed by the pentamirror 65. Thereafter, the light ray passes through an image forming lens 69 (an image forming optical system) and forms an image on an imaging surface of the image sensor 7 again (refer to an light path PB shown in FIG. 6). The light ray reflected off the main mirror 61 travels upwards and is reflected by the dach mirrors 65a and 65b. Thus, the light ray is horizontally reversed and continues to travel. Thereafter, the light ray is reflected off the mirror 65e so as to be vertically reversed. The light ray is then horizontally and vertically reversed by the image forming lens 69. Finally, the light ray reaches the image sensor 7.

More specifically, as can be seen from comparison with FIG. 5, the angle of the mirror 65e (with respect to the camera body 2) is changed, as shown in FIG. 6. That is, from the position shown in FIG. 5, the mirror 65e is rotated about an axis AX1 located at the lower end of mirror 65e in a direction indicated by an arrow AR1 at a predetermined angle α. In this case, the mirror 65e can be rotated about the axis AX1 by an actuator (e.g., a motor) (not shown). When the eye proximity detecting unit 15A detects proximity of the eye to the finder window 10, the mirror 65e is moved to a position Ta at which the upper end of the mirror 65e is in contact with the end of the surface 65c (refer to FIG. 5). In contrast, when the eye proximity detecting unit 15A does not detect proximity of the eye to the finder window 10, the mirror 65e is moved to a position Tb at which the upper end of the mirror 65e is separated from the end of the surface 65c by a predetermined distance (refer to FIG. 6). That is, The mirror 65e has two positions and switches between the two positions: the position Ta (a first position) at which the light ray (the observation light ray) reflected off the main mirror 61 is reflected towards the finder window 10, as shown in FIG. 5, and the position Tb (a second position) at which the observation light ray is reflected towards the image sensor 7, as shown in FIG. 6.

As noted above, by changing the position of the mirror 65e, the reflection angle of the light ray (the observation light ray) can be changed, and therefore, the traveling path of the light ray reflected off the mirror 65e can be changed. More specifically, as compared with FIG. 5, an incident angle θ1 of the light ray on the mirror 65e is relatively small. Therefore, a reflection angle θ2 of the light ray on the mirror 65e is relatively small. As a result, the direction of the light ray reflected off the mirror 65e is changed upwards so that the light path towards the eyepiece lens 67 is changed to the light path towards the dach mirrors 65a and 65b. Thus, the light ray passes through the image forming lens 69 and reaches the image sensor 7. The image forming lens 69 and the image sensor 7 are disposed above the eyepiece lens 67 so as not to block the light ray traveling from the mirror 65e to the eyepiece lens 67.

The angle of the light ray reflected off the mirror 65e is changed to twice the changed angle α of the mirror 65e, that is, an angle β (=2×α). Conversely, only the angle α, which is a half of the angle β, is required for the rotation angle of the mirror 65e in order to change the traveling angle of the reflection light path to the angle β. That is, a relatively small rotation angle of the mirror 65e can relatively largely change the direction of the light ray reflected off the mirror 65e. In addition, the mirror 65e is disposed so as to be separated from the image sensor 7 by a relatively large distance. Accordingly, by slightly changing the rotation angle of the mirror 65e, the two light rays reflected off the mirror 65e can be reliably led to the eyepiece lens 67 and the image sensor 7 which are separated from each other. That is, by slightly changing the rotation angle of the mirror 65e, the light ray reflected off the mirror 65e can be selectively and reliably led to one of the two light paths. Accordingly, an increase in a space required for the rotation of the mirror 65e can be minimized.

The image sensor 7 generates a live view on the basis of the subject image that is reflected by the mirror 65e, passes through the image forming lens 69, and reaches the image sensor 7. More specifically, the image sensor 7 that receives the light ray (the observation light ray) reflected off the main mirror 61 sequentially generates a plurality of image signals at small intervals (e.g., 1/60 sec). The acquired time-series image signals are sequentially displayed on the rear monitor 12 as a live view. Thus, the photographer can determine a composition while viewing the moving image (the live view image) displayed on the rear monitor 12.

While the live view is displayed, light entering the image sensor 7 through the finder window 10 may degrade the quality of the subject image acquired by the image sensor 7, since the image sensor 7 is located in the vicinity of the finder window 10. Accordingly, the image pickup apparatus 1A includes the eyepiece shutter (shutter means) 16 between the finder window 10 and the eyepiece lens 67. The eyepiece shutter 16 can switch between a light blocking state in which external light entering the image pickup apparatus 1A through the finder window 10 is blocked and a non-blocking state in which the external light is not blocked. In this way, by letting the eyepiece shutter 16 enter a closed state Qb (refer to FIG. 6) while the live view is displayed (the electronic finder is in use), external light can be blocked from entering through the finder window 10.

In this case, as in determining a composition using the optical finder (refer to FIG. 5), an AF operation is performed using light made incident on the AF module 20 by the main mirror 61 and the sub-mirror 62.

As described above, the direction of an observation light ray reflected off the mirror 65e is switched between the light path PA (refer to FIG. 5) and the light path PB (refer to FIG. 6) by changing the reflection angle at the mirror 65e. The light path PA is directed from the mirror 65e to the eyepiece lens 67 and the finder window 10, while the light path PB is directed from the mirror 65e to the image forming lens 69 and the image sensor 7. That is, by changing the reflection angle at the mirror 65e, the direction of an observation light ray can be switched between the first light path PA in which a light ray is reflected off the mirror 65e towards the finder window 10 and the second light path PB in which a light ray is reflected off the mirror 65e towards the image sensor 7.

In addition, in the image pickup apparatus 1A, among the dach mirrors 65a and 65b and the mirror 65e of the pentamirror 65, one of the reflecting surfaces (the mirror 65e) is moved so that the reflection angle is changed, whereas the other reflecting surfaces (dach mirrors 65a and 65b) are stationary. That is, by driving only the mirror 65e among the plurality of reflecting surfaces so that the direction of the observation light ray is changed, the number of driving mechanisms can be reduced, and therefore, a compact configuration can be achieved. Furthermore, in the image pickup apparatus 1A, the reflection angle at the mirror 65e, which is a reflecting surface other than the dach mirrors 65a and 65b among a plurality of reflecting surfaces included in the pentamirror 65 of the finder optical system 60, is changed in order to change the direction of the observation light ray. Accordingly, the direction of the observation light ray can be easily changed, as compared with the case where the dach mirrors 65a and 65b are driven.

The image pickup apparatus 1A having such a configuration determines that a photographer desires to determine a composition using the electronic finder if the eye proximity detecting unit 15A does not detect proximity of the eye to the finder window 10. At that time, the image pickup apparatus 1A sets the mirror 65e to the position Tb shown in FIG. 6 to select the light path PB directed to the image sensor 7. At the same time, the image pickup apparatus 1A turns on the rear monitor 12 (a display mode) so that a live view is displayed on the basis of an image signal acquired from the image sensor 7. In this case, if an external light ray enters the body of the image pickup apparatus 1A through the finder window 10, an exposure operation performed by the image sensor 7 (or the image sensor 5) may have a negative impact. Therefore, the image pickup apparatus 1A causes the eyepiece shutter 16 to enter the closed state Qb (refer to FIG. 6) in order to block the external light ray from entering through the finder window 10.

In contrast, the image pickup apparatus 1A determines that a photographer desires to determine a composition using the optical finder if the eye proximity detecting unit 15A detects proximity of the eye to the finder window 10. At that time, the image pickup apparatus 1A sets the mirror 65e to the position Ta shown in FIG. 5 to select the light path PA directed to the finder window 10. In this case, the image pickup apparatus 1A causes the eyepiece shutter 16, which is in the closed state Qb when proximity of the eye is not detected, to enter an open state Qa (refer to FIG. 5) in order to open the light path PA. In addition, the image pickup apparatus 1A turns off the rear monitor 12 (a non-display mode) which is turned on when proximity of the eye is not detected.

The above-described operation performed by the image pickup apparatus 1A when a composition is determined is described in more detail below.

Operation Performed by Image Pickup Apparatus 1A

Figure 7:
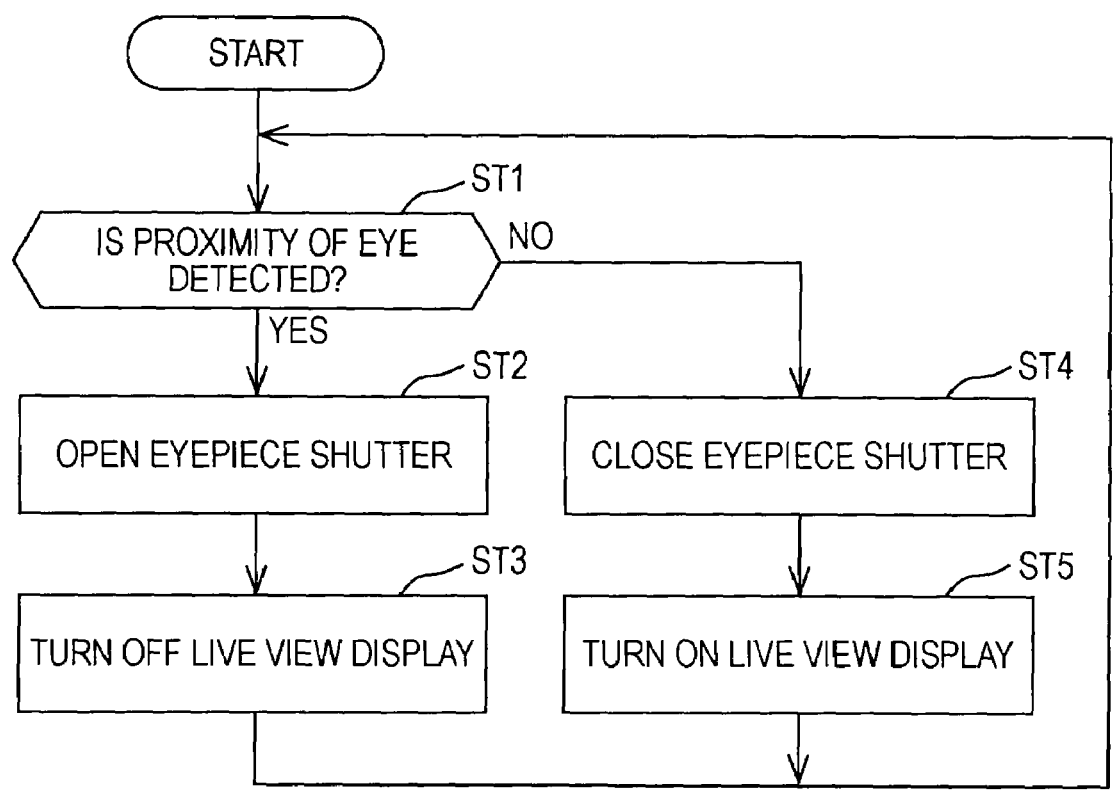
FIG. 7 is a flow chart of a basic operation performed by the image pickup apparatus.

FIG. 7 is a flow chart of a basic operation performed by the image pickup apparatus 1A and, in particular, an operation performed when a composition is determined.

When a photographer operates the main switch 81 to power on the image pickup apparatus 1A, the eye proximity detecting unit 15A determines whether proximity of the eye is detected (step ST1). If proximity of the eye is detected, the process proceeds to step ST2. Otherwise, the process proceeds to step ST4.

In step ST2, the image pickup apparatus 1A causes the eyepiece shutter 16 to enter the open state Qa shown in FIG. 5. That is, the image pickup apparatus 1A causes the eyepiece shutter 16 to enter a non-light blocking state so as to open the light path PA directed to the finder window 10. Thus, the image pickup apparatus 1A leads a subject optical image that passed through the lens group 37 to the finder window 10. In the present exemplary embodiment, the global control unit 101A sends a drive control signal to the eyepiece shutter driving circuit 18. Upon receipt of the drive control signal, the eyepiece shutter driving circuit 18 opens the eyepiece shutter 16 using the motor 17.

Subsequently, the image pickup apparatus 1A causes the mirror (reflecting surface) 65e to move to the position (the first position) Ta shown in FIG. 5 so that the subject optical image is led from the photo-taking lens unit 3 to the finder window 10. Thus, the photographer can check the subject image through the finder window 10.

In step ST3, a live view display is turned off. That is, since the photographer determines a composition using the optical finder, the rear monitor 12 that is not used by the photographer is turned off (a non-display mode). Thus, power consumption can be reduced.

In step ST4, the image pickup apparatus 1A causes the eyepiece shutter 16 to enter the closed state Qb shown in FIG. 6. That is, in order to block an external light ray from entering through the finder window 10, the eyepiece shutter 16 enters a light blocking state. In the present exemplary embodiment, the global control unit 101A sends a drive control signal to the eyepiece shutter driving circuit 18. Upon receipt of the drive control signal, the eyepiece shutter driving circuit 18 closes the eyepiece shutter 16 using the motor 17.

Subsequently, the image pickup apparatus 1A causes the mirror (reflecting surface) 65e to move to the position (the second position) Tb shown in FIG. 6 so that the subject optical image is led from the photo-taking lens unit 3 to the image sensor 7.

In step ST5, a live view display is turned on. That is, since the photographer desires to determine a composition using the electronic finder, the rear monitor 12 is turned on (a display mode). Thus, a live view display (a preview display) is performed on the basis of image signals sequentially generated by the image sensor 7.

In the above-described operation of the image pickup apparatus 1A, when the eye proximity detecting unit 15A detects proximity of the eye to the finder window 10, the eyepiece shutter 16 is opened and the rear monitor 12 is turned off. However, when the eye proximity detecting unit 15A does not detect proximity of the eye to the finder window 10, the eyepiece shutter 16 is closed in order to block an external light ray from entering through the finder window 10, and the rear monitor 12 is turned on in order to display a live view image. In this way, the workload of the photographer can be reduced in switching between the optical finder and the electronic finder, and power consumption can be appropriately reduced. In addition, an external light ray can be reliably blocked from entering through the finder window 10.

Second Exemplary Embodiment

According to a second exemplary embodiment of the present invention, an image pickup apparatus 1B has a configuration similar to the image pickup apparatus 1A shown in FIGS. 1, 2, and 4. However, the configurations of an eye proximity detecting unit, a rear monitor, and a global control unit are different from those of the image pickup apparatus 1A. An eye proximity detecting unit 15B, a rear monitor 12B, and a global control unit 101B of the image pickup apparatus 1B, which are different from those of the image pickup apparatus 1A, are sequentially described below.

In the eye proximity detecting unit 15B, a light detecting sensor 152 can detect the amount of light in the vicinity of the light detecting sensor 152 (around the finder window 10) in addition to the amount of light required for detecting proximity of the eye.

The rear monitor 12B includes a semi-transmissive liquid crystal display. That is, the rear monitor 12B can be used as a reflective liquid crystal display that displays an image using reflection of external light as a light source with a backlight turned off. Alternatively, the rear monitor 12B can be used as a transmissive liquid crystal display that turns on a backlight serving as a light source and displays an image using illumination of the backlight from the rear.

When an amount of light detected by the light detecting sensor 152 of the eye proximity detecting unit 15B is greater than a predetermined threshold value (a predetermined amount of light) Lm, and therefore, the surrounding area is bright, the rear monitor 12B is switched to a reflective liquid crystal display, and the backlight is turned off. Thus, power consumption can be reduced.

The global control unit 101B stores, in a ROM, a program for performing the operation of the image pickup apparatus 1B described below.

Operation Performed by Image Pickup Apparatus 1B

Figure 8:
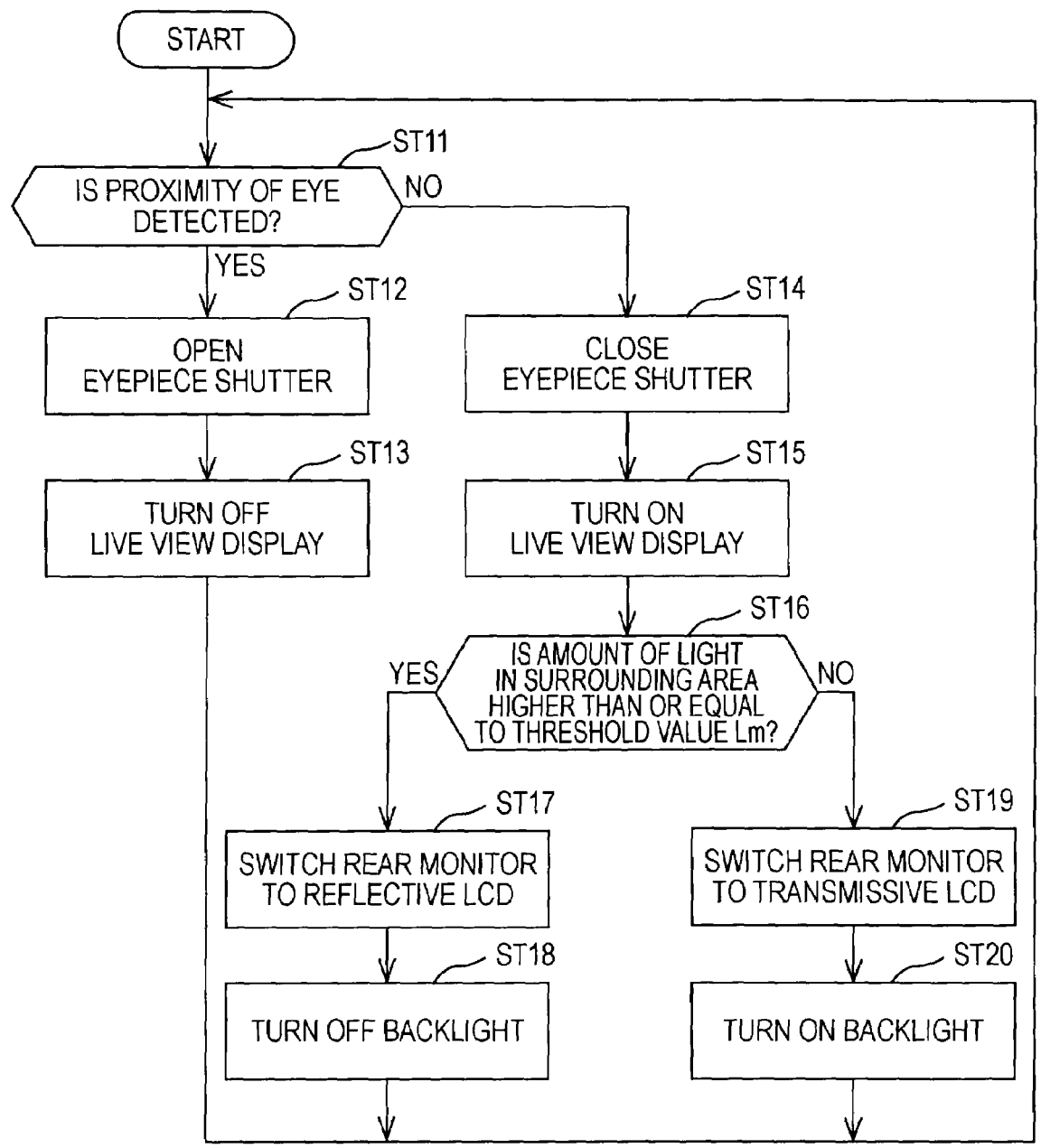
FIG. 8 is a flow chart of a basic operation performed by an image pickup apparatus according to a second exemplary embodiment of the present invention.

FIG. 8 is a flow chart of a basic operation performed by the image pickup apparatus 1B and, in particular, an operation performed when a composition is determined.

The processes performed in steps ST11 to ST15 are similar to those in steps ST1 to ST5 of the flow chart shown in FIG. 7.

In step ST16, it is determined whether an amount of light in the surrounding area detected by the light detecting sensor 152 of the eye proximity detecting unit 15B is higher than or equal to the predetermined threshold value Lm. That is, it is determined whether the surrounding area of the image pickup apparatus 1B (on the rear side of the image pickup apparatus 1B) is bright or dark. If the amount of light in the surrounding area is higher than or equal to the predetermined threshold value Lm, and therefore, the surrounding area is bright, the process proceeds to step ST17. However, if the amount of light in the surrounding area is lower than the predetermined threshold value Lm, and therefore, the surrounding area is dark, the process proceeds to step ST19.

In steps ST17 and ST18, the rear monitor 12B is switched to the reflective liquid crystal display, and the backlight of the rear monitor 12B is turned off.

In steps ST19 and ST20, the rear monitor 12B is switched to the transmissive liquid crystal display, and the backlight of the rear monitor 12B is turned on.

The above-described operation performed by the image pickup apparatus 1B provides an advantage that is the same as that of the first exemplary embodiment. In addition, when the image pickup apparatus 1B displays a live view image and an amount of light in the surrounding area detected by the light detecting sensor 152 of the eye proximity detecting unit 15B is higher than or equal to the predetermined threshold value Lm (in a bright condition), the rear monitor 12B is switched to the reflective liquid crystal display, and the backlight of the rear monitor 12B is turned off. However, when an amount of light in the surrounding area detected by the light detecting sensor 152 of the eye proximity detecting unit 15B is lower than the predetermined threshold value Lm (in a dark condition), the rear monitor 12B is switched to the transmissive liquid crystal display, and the backlight of the rear monitor 12B is turned on. Therefore, power consumption is optimally reduced.

Modifications

The eyepiece shutters of the foregoing exemplary embodiments are not limited to mechanically open and closed shutters as shown in FIGS. 5 and 6. For example, a liquid crystal shutter having the following configuration may be employed.

Figure 9:
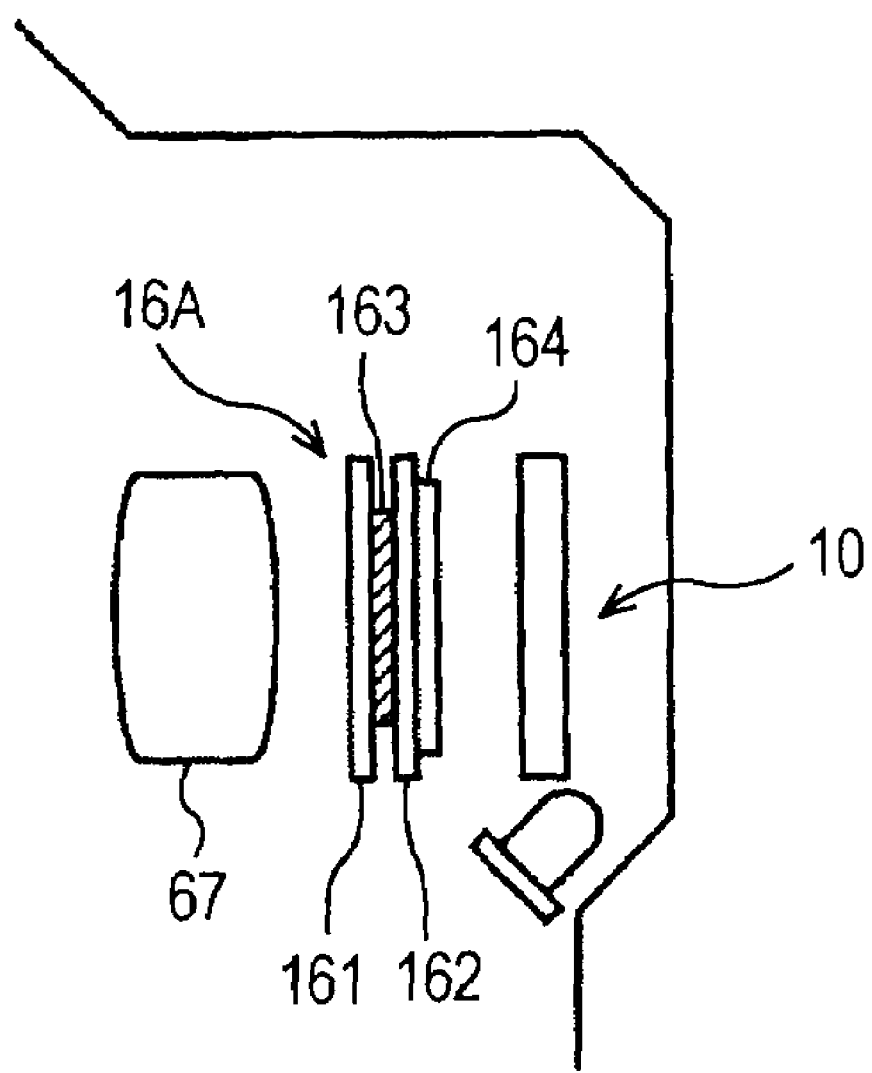
FIG. 9 illustrates an exemplary configuration of an eyepiece shutter according to a modification of the present invention.

FIG. 9 illustrates an exemplary configuration of an eyepiece shutter 16A of a modification of the present invention.

The eyepiece shutter 16A is a liquid crystal shutter. In the eyepiece shutter 16A, a liquid crystal 163 is confined between two glass pieces 161 and 162. In addition, a deflection plate 164 is disposed on the glass piece 162.

For the eyepiece shutter 16A having such a configuration of a liquid crystal shutter, when the eye proximity detecting unit 15A (or 15B) detects the eye is not in proximity to the finder window, the eyepiece shutter 16A is closed. Thus, external light entering through the finder window 10 can be blocked.

While the foregoing exemplary embodiments have been described with reference to the eyepiece shutter disposed inside the finder window 10, as shown in FIG. 6, the eyepiece shutter may be disposed, for example, outside the finder window 10.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   image pickup means for generating an image signal associated with a subject optical image that has passed through a predetermined photo-taking optical system;
   display means capable of being switched between a display mode and a non-display mode;
   electronic finder means for causing the display means to display a preview image on the basis of image signals sequentially generated by the image pickup means before the image is actually recorded;
   optical finder means for leading the subject optical image that has passed through the predetermined photo-taking optical system to a finder window;
   eye proximity detecting means for detecting proximity of the eye to the finder window;
   shutter means capable of being switched between a light-blocking mode and a non-light-blocking mode, the shutter means blocking an external light ray from entering the image pickup apparatus through the finder window when in the light-blocking mode, the shutter means allowing an external light ray to enter the image pickup apparatus through the finder window when in the non-light-blocking mode;

first control means for switching the display means to the non-display mode and switching the shutter means to the non-light-blocking mode so as to lead the subject optical image to the finder window when the eye proximity detecting means detects proximity of the eye to the finder window; and second control means for switching the shutter means to the light-blocking mode and switching the display means to the display mode so as to display the preview image when the eye proximity detecting means does not detect proximity of the eye to the finder window, wherein the display means includes a semi-transmissive liquid crystal display monitor capable of being switched between a function of a reflective liquid crystal display monitor that uses reflection of external light as a light source and a function of a transmissive liquid crystal display monitor that uses a backlight as a light source, the eye proximity detecting means includes light amount measuring means for measuring an amount of light in a surrounding area, and the second control means includes means for switching the semi-transmissive liquid crystal display monitor to the reflective liquid crystal display monitor and turning off the backlight if the amount of light measured by the light amount measuring means is higher than or equal to a predetermined amount of light and means for switching the semi-transmissive liquid crystal display monitor to the transmissive liquid crystal display monitor and turning on the backlight if the amount of light measured by the light amount measuring means is lower than the predetermined amount of light.

2. An image pickup apparatus comprising:

image pickup means for generating an image signal associated with a subject optical image that has passed through a predetermined photo-taking optical system;

display means capable of being switched between a display mode and a non-display mode;

electronic finder means for causing the display means to display a preview image on the basis of image signals sequentially generated by the image pickup means before the image is actually recorded;

optical finder means for leading the subject optical image that has passed through the predetermined photo-taking optical system to a finder window;

eye proximity detecting means for detecting proximity of the eye to the finder window;

shutter means capable of being switched between a light-blocking mode and a non-light-blocking mode, the shutter means blocking an external light ray from entering the image pickup apparatus through the finder window when in the light-blocking mode, the shutter means allowing an external light ray to enter the image pickup apparatus through the finder window when in the non-light-blocking mode;

first control means for switching the display means to the non-display mode and switching the shutter means to the non-light-blocking mode so as to lead the subject optical image to the finder window when the eye proximity detecting means detects proximity of the eye to the finder window; and second control means for switching the shutter means to the light-blocking mode and switching the display means to the display mode so as to display the preview image when the eye proximity detecting means does not detect proximity of the eye to the finder window, wherein the optical finder means includes a finder optical system for leading, to the finder window, an observation light ray that travels from the predetermined photo-taking optical system and that is reflected off a main reflecting surface, and wherein the image pickup means includes an image sensor for receiving the observation light ray and generating the image signal, and the finder optical system includes a predetermined reflecting surface for reflecting the observation light ray and position switching means for switching the position of the predetermined reflecting surface between a first position and a second position, where the observation light ray is reflected towards the finder window at the first position and the observation light ray is reflected towards the image sensor at the second position, and wherein the first control means includes means for switching the predetermined reflecting surface to the first position using the position switching means so as to lead the subject optical image to the finder window when the eye proximity detecting means detects proximity of the eye to the finder window, and wherein the second control means includes means for switching the predetermined reflecting surface to the second position using the position switching means so as to cause the preview image to be displayed on the basis of the image signals sequentially generated by the image sensor when the eye proximity detecting means does not detect proximity of the eye to the finder window.

3. An image pickup apparatus comprising:

an image pickup unit configured to generate an image signal associated with a subject optical image that has passed through a predetermined photo-taking optical system;

a display unit capable of being switched between a display mode and a non-display mode;

an electronic finder unit configured to cause the display unit to display a preview image before the image is actually recorded on the basis of image signals sequentially generated by the image pickup unit;

an optical finder unit configured to lead the subject optical image that has passed through the predetermined photo-taking optical system to a finder window;

an eye proximity detecting unit configured to detect proximity of the eye to the finder window;

a shutter unit capable of being switched between a light-blocking mode and a non-light-blocking mode, the shutter unit blocking an external light ray from entering the image pickup apparatus through the finder window when in the light-blocking mode, the shutter unit allowing an external light ray to enter the image pickup apparatus through the finder window when in the non-light-blocking mode;

a first control unit configured to switch the display unit to the non-display mode and switch the shutter unit to the non-light-blocking mode so as to lead the subject optical image to the finder window when the eye proximity detecting unit detects proximity of the eye to the finder window; and a second control unit configured to switch the shutter unit to the light-blocking mode and switch the display unit to the display mode so as to display the preview image when the eye proximity detecting unit does not detect proximity of the eye to the finder window, wherein the display unit includes a semi-transmissive liquid crystal display monitor capable of being switched between a function of a reflective liquid crystal display monitor that uses reflection of external light as a light source and a function of a transmissive liquid crystal display monitor that uses a backlight as a light source, the eye proximity detecting unit includes a light amount measuring unit configured to measure an amount of light in a surrounding area, and the second control unit is configured to switch the semi-transmissive liquid crystal display monitor to the reflective liquid crystal display monitor and turn off the backlight if the amount of light measured by the light amount measuring unit is higher than or equal to a predetermined amount of light, and switch the semi-transmissive liquid crystal display monitor to the transmissive liquid crystal display monitor and turn on the backlight if the amount of light measured by the light amount measuring unit is lower than the predetermined amount of light.

4. An image pickup apparatus comprising:

an image pickup unit configured to generate an image signal associated with a subject optical image that has passed through a predetermined photo-taking optical system;

a display unit capable of being switched between a display mode and a non-display mode;

an electronic finder unit configured to cause the display unit to display a preview image before the image is actually recorded on the basis of image signals sequentially generated by the image pickup unit;

an optical finder unit configured to lead the subject optical image that has passed through the predetermined phototaking optical system to a finder window;

an eye proximity detecting unit configured to detect proximity of the eye to the finder window;

a shutter unit capable of being switched between a light-blocking mode and a non-light-blocking mode, the shutter unit blocking an external light ray from entering the image pickup apparatus through the finder window when in the light-blocking mode, the shutter unit allowing an external light ray to enter the image pickup apparatus through the finder window when in the non-light-blocking mode;

a first control unit configured to switch the display unit to the non-display mode and switch the shutter unit to the non-light-blocking mode so as to lead the subject optical image to the finder window when the eye proximity detecting unit detects proximity of the eye to the finder window; and a second control unit configured to switch the shutter unit to the light-blocking mode and switch the display unit to the display mode so as to display the preview image when the eye proximity detecting unit does not detect proximity of the eye to the finder window, wherein the optical finder unit includes a finder optical system for leading, to the finder window, an observation light ray that travels from the predetermined photo-taking optical system and that is reflected off a main reflecting surface, the image pickup unit includes an image sensor configured to receive the observation light ray and generate the image signal, the finder optical system includes a predetermined reflecting surface for reflecting the observation light ray and position switching unit configured to switch the position of the predetermined reflecting surface between a first position and a second position, where the observation light ray is reflected towards the finder window at the first position and the observation light ray is reflected towards the image sensor at the second position, the first control unit is configured to switch the predetermined reflecting surface to the first position using the position switching unit so as to lead the subject optical image to the finder window when the eye proximity detecting unit detects proximity of the eye to the finder window, and the second control unit is configured to switch the predetermined reflecting surface to the second position using the position switching unit so as to cause the preview image to be displayed on the basis of the image signals sequentially generated by the image sensor when the eye proximity detecting unit does not detect proximity of the eye to the finder window.

5. An image pickup apparatus comprising:

an image pickup unit configured to generate an image signal associated with a subject optical image that has passed through a predetermined photo-taking optical system;

a display unit configured to be switched between a display mode and a non-display mode;

an electronic finder unit configured to cause the display unit to display a preview image before the image is actually recorded on the basis of image signals sequentially generated by the image pickup unit;

an optical finder unit configured to lead the subject optical image that has passed through the predetermined phototaking optical system to a finder window;

an eye proximity detecting unit configured to detect proximity of the eye to the finder window, wherein the optical finder unit includes a finder optical system for leading, to the finder window, an observation light ray that travels from the predetermined photo-taking optical system and that is reflected off a main reflecting surface, the image pickup unit includes an image sensor configured to receive the observation light ray and generate the image signal, the finder optical system includes a predetermined reflecting surface for reflecting the observation light ray and position switching unit configured to switch the position of the predetermined reflecting surface between a first position and a second position, where the observation light ray is reflected towards the finder window at the first position and the observation light ray is reflected towards the image sensor at the second position;

a first control unit configured to switch the predetermined reflecting surface to the first position using the position switching unit so as to lead the subject optical image to the finder window when the eye proximity detecting unit detects proximity of the eye to the finder window; and a second control unit configured to switch the predetermined reflecting surface to the second position using the position switching unit so as to cause the preview image to be displayed on the basis of the image signals sequentially generated by the image sensor when the eye proximity detecting unit does not detect proximity of the eye to the finder window.

* * * * *